C. H. KICKLIGHTER.
SYNCHRONOUS RECTIFIER.
APPLICATION FILED AUG. 25, 1909.
1,123,307.
Patented Jan. 5, 1915.
3 SHEETS—SHEET 1.
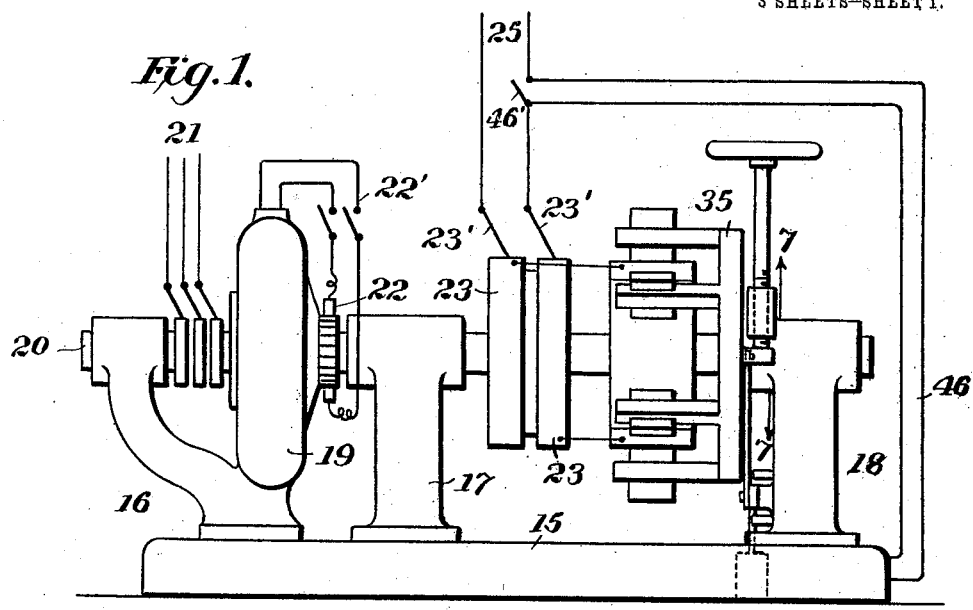
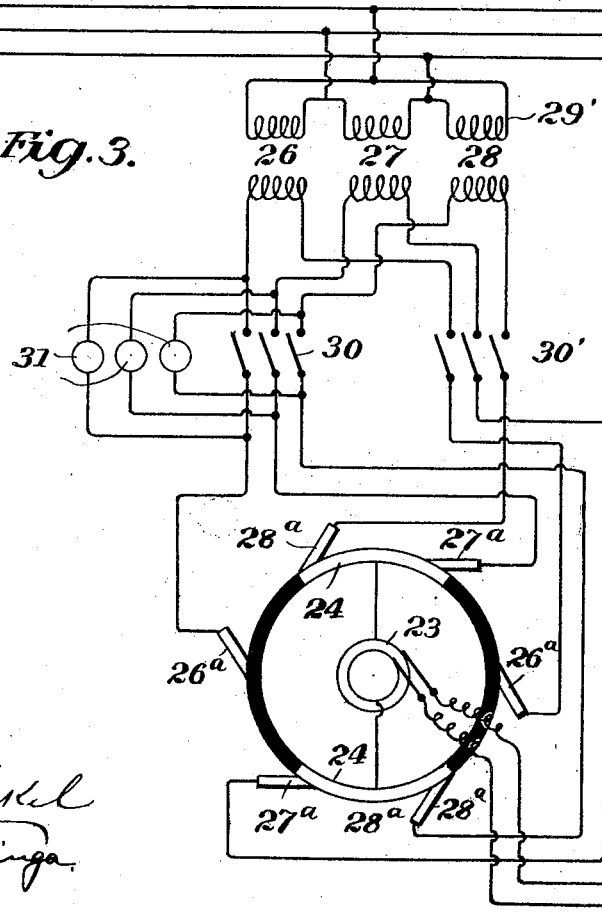
Witnesses
Inventor
Charles H. Kicklighter
By Foster, Freeman, Watson & Coit
Attorneys

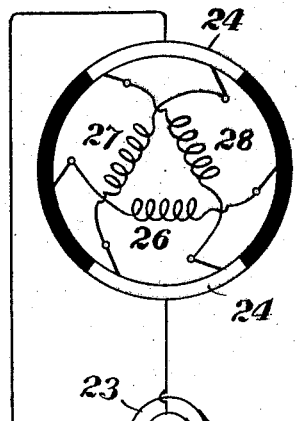
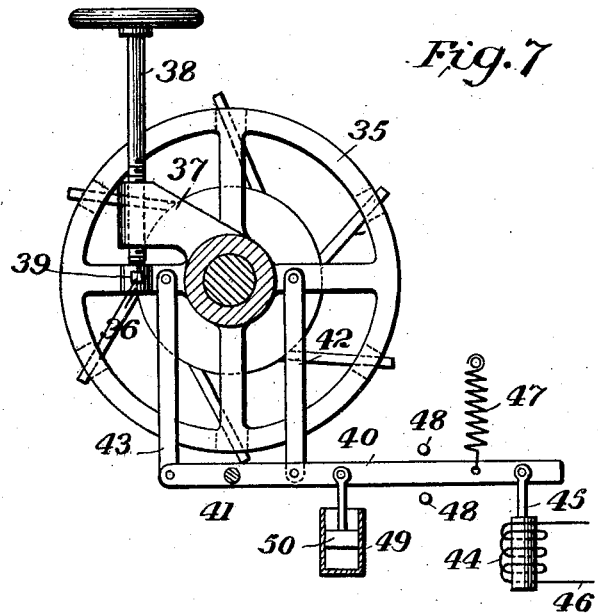
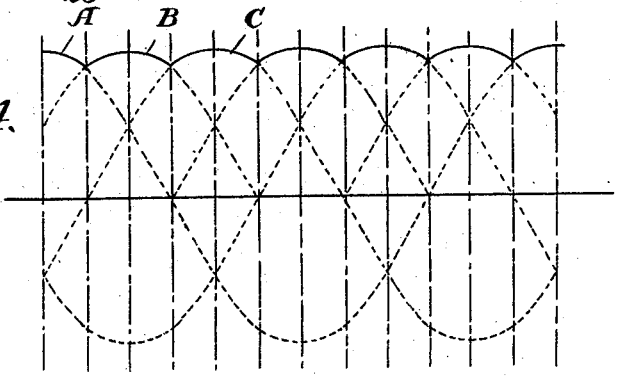
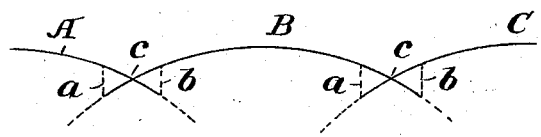

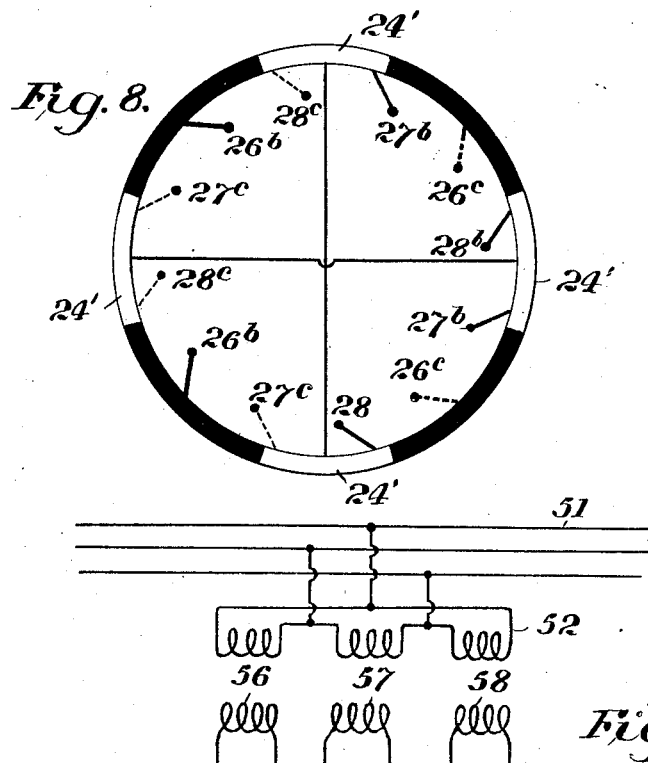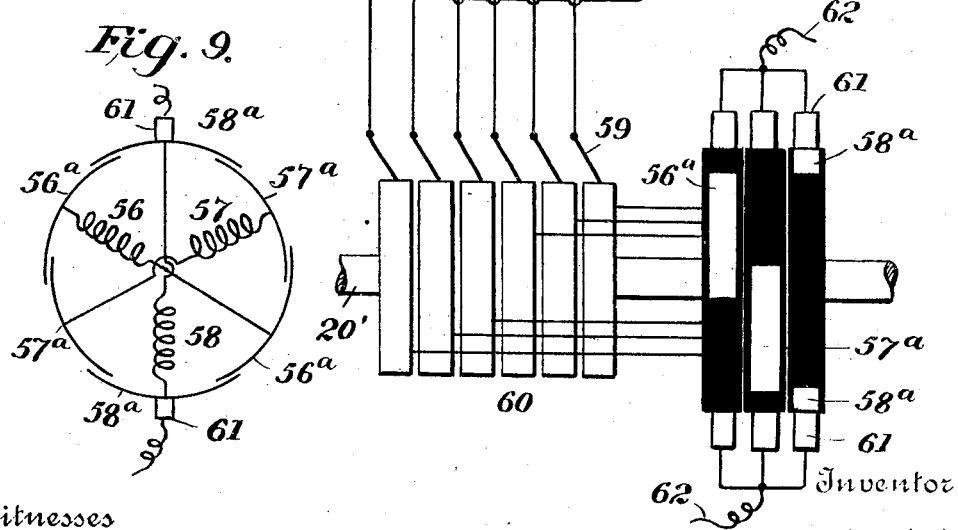

UNITED STATES PATENT OFFICE.

CHARLES H. KICKLIGHTER, OF NEWBERRY, SOUTH CAROLINA.

SYNCHRONOUS RECTIFIER.

1,123,307.

Specification of Letters Patent.

Patented Jan. 5, 1915.

Application filed August 25, 1909. Serial No. 514,583.

*To all whom it may concern:*

Be it known that I, CHARLES H. KICK-LIGHTER, a citizen of the United States, and resident of Newberry, county of Newberry, and State of South Carolina, have invented certain new and useful Improvements in Synchronous Rectifiers, of which the following is a specification.

This invention relates to a method and apparatus for rectifying polyphase alternate currents and has for its object the attainment of a method and apparatus whereby a polyphase alternating current may be converted into a direct current with sparkless commutation.

The method broadly stated consists in successively connecting the separate phases of a polyphase supply circuit in series with the direct current working circuit during those intervals in which the electromotive force developed in the connected phase is greater than in the other phases. As soon as the electromotive force drops so as to become equal to that in the next succeeding phase, the phase is disconnected from the working circuit and the succeeding phase is connected thereto. At the instant of commutation when the electromotive forces in both phases are substantially equal, they are connected in parallel. By means of this arrangement sparking is avoided as the phases are never short circuited.

The apparatus consists in a rectifying commutator having segments and brushes for attaining the above results. The commutator is driven in synchronism with the polyphase supply circuit and the brushes are spaced around the commutator and the segments are of such length that the separate phases are successively connected in series with the working circuit twice per cycle. At the moment of commutation the succeeding phases are connected in parallel to the working circuit, and the transfer from one phase to the next is made while the electromotive forces in the phases are substantially equal. This enables the current to be gradually shifted from the phase whose pressure is falling to the succeeding phase whose pressure is rising and thus sparking is avoided. The brushes are provided with mechanism whereby they may be shifted. This shifting mechanism comprises a manually controlled handle and an automatic mechanism controlled by the current.

In the drawings, Figure 1 is an elevation showing one form of this invention; Fig. 2 is a simple diagram showing the electrical connections of one of the forms; Fig. 3 is a diagram showing the complete electrical connections; Figs. 4, 5 and 6 are diagrams illustrating the theory of operation; Fig. 7 is a section on the line 7—7, Fig. 1, showing the brush shifting mechanism; Fig. 8 is a diagrammatic view showing another form of commutator; Fig. 9 is a diagrammatic view showing a third form of commutator; Fig. 10 is a diagram of the system using the commutator, shown in Fig. 9.

Referring to the drawings, 15 designates a bed plate to which are bolted pedestals 16, 17 and 18. A field frame 19 of an alternating current motor is cast integral with the pedestal 16. A shaft 20 is mounted in bearings in the pedestals and has mounted upon it the armature of the motor which receives current from the polyphase supply mains 21. The field of the motor is excited in any suitable manner and in this instance the field is shown as excited by current obtained from the rectifying commutator 22, the circuit being provided with the usual switch 22'.

Upon the shaft 20 are mounted slip rings 23, which are connected to segments 24 of the commutator. Brushes 23' bear upon the slip rings and are connected with the direct current working circuit 25. The polyphase supply circuit is designated at 29 and the primaries 29' of the step down transformer are connected thereto. The primary windings of the polyphase transformer are shown in this case as connected in delta. The secondaries of the step down transformer are indicated at 26, 27 and 28. Separate connections lead from the secondaries to brushes located on the commutator. The brushes which are connected to the secondary 26 are indicated at 26ª, the brushes which are connected to the secondary 27 are indicated at 27ª and the brushes which are connected to the secondary 28 are indicated at 28ª. A pair of three-pole switches 30 and 30' are provided for connecting the secondaries to the brushes. It is best to have two independent three-pole switches then 30' can be closed and if the brushes resting on the commutator are not in their proper places, the cross currents between the phases will cause the shunted lamps 31 to glow. When the brushes are properly adjusted the lamps will go out, the switch 30 can then be closed and direct current can be drawn from the working mains 25.

Referring to Fig. 2 which shows a simple diagram of the electrical connections, it will be seen that the secondaries 26, 27 and 28 are successively connected in series with the working circuit 25. The secondaries are connected in series with the working circuit 25 at those intervals in which the electromotive force in the connected secondary is greater than that in the other secondaries. As soon as the electromotive force drops, the commutator disconnects that secondary from the working circuit and connects the secondary of the succeeding phase thereto. During the instant of commutation, the secondaries of the two succeeding phases will be connected in parallel, and therefore the transfer of the working circuit to the successive phases will be gradual.

Figs. 4, 5 and 6 illustrate the theory of operation of the rectifier. Referring to said figures A, B and C designate sine waves of a three-phase alternating current. The solid lines show how the negative current is rectified. In Fig. 5 is illustrated the transition of the rectifier from one phase to another. $a$ shows the point where the brushes of phase B make contact with the segments, and $b$ the point where the brushes of A break contact with the segments. During this interval when the two phases are in parallel, the pressure of A is first a little higher than the pressure of B, then the pressures are equal at a point $c$, and then the pressure of B is higher than the pressure of A. A small cross current will tend to flow first one way and then the other, but this manifests itself only when the direct current side is without load and then it is of negligible value. If a heavy current be now drawn on the direct current side, a slight tendency toward sparking may manifest itself because of the breaking of the current in A before it has established itself in B. The correction may be made in various ways, as by the use of larger transformers, by retarding the rotary armature of the motor by one of the methods well understood in the art, or by shifting the brushes, as indicated in Fig. 6. In Fig. 6, connection with the phase B is made at $a'$, while connection with phase A is broken at $b'$. At the time of this break, the pressure in B exceeds that in A by the amount $d$, $e$. This difference of pressure may be adjusted to shift all the current to B by the time contact with A is broken, in which case there will be no sparking.

The adjustment may be manually controlled or automatically controlled. Figs. 1 and 7 show one form of adjustment. The brushes are mounted upon a brush holder 35 which is mounted for rotary movement upon a bearing on the pedestal 18. The brush holder is provided with a lug 36 and the pedestal with an arm 37 adapted to receive a threaded shaft 38 provided with a hand wheel. The lower end of this shaft extends into a hole in the lug and is provided with a circumferential groove adapted to receive a set screw 39. By means of this construction the brush holder may be shifted manually by operating the hand wheel and the shaft 38, and the set screw 39 provides a detachable connection between the hand wheel and the lug 36. In order that the lug may adjust itself to the shaft 38, this lug is preferably pivoted on one of the spokes of the brush holder 35. A lever 40 is pivoted at 41 upon the pedestal 18. This lever is connected to the brush holder by means of links 42, 43. A solenoid winding 44 is mounted upon the bed plate and a solenoid core 45 extends into the solenoid and is pivotally connected to the lever 40. The current traversing the solenoid winding 44 is proportional to the current in the working circuit. In this case the winding is connected in series circuit by means of connections 46 with the direct current working circuit 25, a bridging switch 46' being provided so as to cut out this solenoid. The lever 40 is normally held in engagement with one of the stops 48 mounted upon the pedestal 18 by means of a spring 47. The upper stop represents the no load position of the brushes. A dashpot 49 mounted in the bed plate 15 is provided with a plunger 50 connected to the lever 40 to dampen it.

It will thus be seen that the above construction provides both a manually and an automatically controlled mechanism for controlling the position of the brushes. If the variation in the current taken from the rectifier is gradual, or if the current is constant for large periods and the variation may be determined in advance, the manually controlled mechanism may be used for shifting the brushes. However if the variation of current is rapid, as in the case where the load is composed of motors which are frequently started and stopped, it is preferable to use the automatically controlled mechanism. Either may be used at will by connecting or disconnecting the shaft 38 from the lug 36 and by opening and closing the switch 46'.

In a rectifier of two segments one revolution per cycle is sufficient but the rectifier can be operated at just one-half or one-third speed with the same number of brushes by interconnecting the collecting segments of like potential in any suitable manner. Fig. 8 shows such a connection. The numbers $26^b$, $27^b$ and $28^b$, $26^c$, $27^c$ and $28^c$ show all possible positions of the brushes. It is evident that the dotted brushes can be omitted and that remaining brushes $26^b$, $27^b$ and $13^c$ 28<sup>b</sup> can collect the current. In this construction the arcs spanned by the segments 24' are just one-half of that shown in Fig. 2. The opposite segments are interconnected, as shown. By this construction a slower speed of the rectifier may be employed, while the number of brushes is not increased, and these brushes are distributed around the rectifier commutator in such a way as to avoid crowding.

Figs. 9 and 10 show another form in which the secondaries are connected to slip rings electrically connected to the commutator segments, while the direct current is taken off by a pair of brushes resting on the commutator. In this form 51 designates the polyphase supply circuit having connected thereto the primaries 52 of the polyphase transformer, the transformer windings being connected in delta. The secondaries of the step down transformer are designated by 56, 57 and 58. The open secondaries of the transformers are connected to slip rings 60 mounted upon a shaft 20', which slip rings are connected to the commutator segments. In tracing out the connections, it will be seen that the secondary 56 is connected to the segments 56<sup>a</sup>, the secondary 57 to the segments 57<sup>a</sup>, and the secondary 58 to the segments 58<sup>a</sup>. The current is collected from the commutator by means of brushes 61 connected to the terminals of the direct current working circuit designated by 62, 62.

It will be noted that the segments connected to the successive phases overlap and thus the operation of this rectifier will be the same as in the construction shown in Figs. 2 and 3, that is, the separate secondaries will be successively connected in series with the direct current working circuit and during the transfer of the direct current circuit from one phase to another, two phases will be connected in parallel.

The alternating current motor which drives the rectifier is preferably of the synchronous type and is preferably provided with devices for preventing hunting. These devices are well known to those skilled in the art and consist in copper bridges or squirrel cage windings located in the field poles.

In order to obtain good results, the length of the arc spanned by the segment is substantially equal to one-half of the angle of displacement of the phases or a divisor of the same, as shown in Fig. 8, where a number of segments are interconnected. Similarly the arc spanned by adjacent brushes is also substantially equal to one-half of the angle of displacement of the phases or a divisor of the same. Thus in a three-phase rectifier the angle of displacement of the brushes or the arc spanned by the segments will be substantially 60° or a divisor of the same; in a four-phase rectifier 45° or a divisor of the same; in a five-phase 36° or a divisor of the same; in a six-phase 30° or a divisor of the same and so on. By increasing the arc spanned by the segments of the rectifier the time during which the two secondaries are in parallel may be increased until the period when one alone is in circuit is reduced to zero and there are always two in parallel and even at times three. But the feeble cross currents in the original case become heavier and heavier especially on light loads until the arrangement becomes absolutely inoperative and impracticable. It will, however, be found that the proportions above designated will give the most satisfactory results.

It will thus be seen that the separate phases are separately and successively connected in series with the direct current working circuit during the time when the electromotive force in the phase which is connected is the greatest and as soon as the electromotive force drops to the value of the succeeding phase it is disconnected from the working circuit and the next phase connected. The transfer is made gradually and without short circuiting the secondary which is connected or disconnected. By thus separately and successively connecting the separate phases to the working circuit, the cross currents between the phases, which occur in the case where all the phases are connected in series with a direct current working circuit at all times, are avoided.

In the specific type described, the invention is shown as applied to a three-phase system. It is obvious, however, that this invention may be applied to polyphase systems other than three-phase systems and it is to be therefore understood that this invention is not to be limited to a three-phase system.

It is further obvious that various changes may be made in the details of construction without departing from the spirit of this invention, and it is therefore to be understood that this invention is not to be limited to the specific construction shown and described.

Having described my invention what I claim and desire to secure by Letters-Patent is—.

1. The combination with a three phase supply circuit the individual phases of which have separate terminals, of a direct current working circuit, a rectifier, and a motor connected to the supply circuit and driving the rectifier in synchronism therewith, said rectifier having segments and brushes arranged to successively and separately connect the individual phases of said supply circuit in series with the working circuit in a manner to avoid short circuiting the phases at the time of transfer, said rectifier being arranged to connect each phase to the working circuit while the electromotive force in each phase is at a maximum and before the preceding one is disconnected therefrom and at that time at which the electromotive force developed in the phase which is connected is of slightly greater value than in the preceding phase which is disconnected, the said rectifier being adapted to connect the two succeeding phases in parallel to the working circuit at the time of transfer and means for varying the adjustment of said segments and brushes.

2. The combination of a polyphase supply circuit, a transformer connected thereto and including a secondary winding the phases of which are separate and provided with independent terminals, a direct current working circuit, a rectifier arranged to be driven in synchronism with the supply circuit and provided with a set of segments and a set of brushes, the angular displacement of the members of one of said sets being substantially a divisor of one-half of the angular displacement between the phases of the supply circuit, and non-adjacent members forming a pair and being connected to and in the same circuit, connections from the separate phases of the secondary winding to the members of one of said sets and other connections from the working circuit to the members of the other of said sets.

3. The combination of a three phase supply circuit, a transformer connected thereto and including a secondary winding the phases of which are independent and have separate terminals, a direct current working circuit, means for successively and individually connecting the separate phases of said secondary winding in series with the working circuit and adapted to prevent short circuiting of the phases at the time of transfer, said means being arranged to connect each phase to the working circuit before the preceding phase is disconnected therefrom and at that time at which the electromotive force developed in the phase which is connected is slightly greater than in the preceding phase which is disconnected, the means being adapted to connect the two succeeding phases in parallel to the working circuit at the time of transfer and means for varying the adjustment of said connecting means comprising a manually operable shifting member and an automatically operable shifting member, either of said shifting members being adapted to be set in operation at will.

4. The combination of a polyphase supply circuit, a transformer having its primary winding connected to said polyphase circuit, the secondary of said transformer comprising separate phases having separate pairs of leads, two three-pole switches, one of each of said pairs of leads being connected to the first three-pole switch, the other of each of said pairs of leads being connected to the second three-pole switch, a commutator rotatable in synchronism with said polyphase supply, a direct current working circuit, a set of segments on said commutator to which the working circuit is connected, pairs of brushes adapted to bear on the segments of the commutator, the brushes comprising each pair being located on opposite sides of said commutator and connected to corresponding poles of said two three-pole switches, a device connected to each pair of brushes and in shunt circuit around one of said switches to one of each of the leads of said secondary phases and arranged to indicate when the adjustment of the brushes is such that the cross currents between the secondary phases is substantially zero, said commutator through said segments and brushes being adapted to successively and individually connect the separate secondary phases to the working circuit to supply power thereto when said switches are closed, each of said secondary phases being connected to the working circuit before the preceding one is disconnected therefrom and while the electromotive force developed therein is a maximum, two succeeding phases being connected in parallel to the working circuit at the time of transfer, and means for adjusting the relative position of the segment and brushes comprising a manually operable shifting member and an automatically operable shifting member, either of said shifting members being adapted to be set in operation at will.

5. The combination of a polyphase supply circuit, a commutator driven in synchronism with said supply circuit and having segments, pairs of brushes spaced about said commutator and connected in pairs to separate phases of said polyphase supply circuit, slip rings rotating with said commutator and connected to said segments, and a direct current working circuit connected to the slip rings, the segments of the commutator being of such length that separate phases of the polyphase supply circuit are successively connected in series with the working circuit twice per cycle.

6. The combination of a polyphase supply circuit, a transformer, the phases of its primary winding connected in delta to said supply circuit, the phases of the secondary winding of said transformer being separate and having separate pairs of leads, two separate three-pole switches, one lead of each of the pairs of secondary leads being connected to one pole of one of said switches and the other lead of each pair being connected to a pole of the other switch, a direct current working circuit, a commutator rotating in synchronism with said supply circuit and having the segments thereof connected with said direct current working circuit, pairs of brushes bearing on and spaced around said commutator, the brushes comprising a pair being located on opposite sides of the commutator and connected to corresponding poles of the two switches, and means connected in shunt around the poles of one of said switches to indicate when the adjustment of the brushes is such that the cross current between the phases is substantially zero.

7. The combination of a polyphase supply circuit, a transformer, the phases of its primary winding connected in delta to said supply circuit, the phases of the secondary winding of said transformer being separate and having separate pairs of leads, two separate three-pole switches, one lead of each of the pairs of secondary leads being connected to one pole of one of said switches and the other lead of each pair being connected to a pole of the other switch, a direct current working circuit, a commutator rotating in synchronism with said supply circuit and having the segments thereof connected with said direct current working circuit, pairs of brushes bearing on and spaced around said commutator, the brushes comprising a pair, being located on opposite sides of the commutator and connected to corresponding poles of the two switches, means connected in shunt around the poles of one of said switches to indicate when the adjustment of the brushes is such that the cross current between the phases is substantially zero, and means for shifting the brushes comprising a manual device and an automatic device, either of which is adapted to be set in operation at will.

In testimony whereof I affix my signature in presence of two witnesses.

CHARLES H. KICKLIGHTER.

Witnesses:
R. C. EVE,
R. P. POOL.

Copies of this patent may be obtained for five cents each, by addressing the "Commissioner of Patents, Washington, D. C."